United States Patent

Soum

[15] 3,665,665
[45] May 30, 1972

[54] ASSEMBLY OF CONCRETE SUPPORT ELEMENTS

[72] Inventor: Rene Soum, Toulouse, France
[73] Assignee: Entreprise Guiraudie et Auffeve, Toulouse, France
[22] Filed: July 30, 1970
[21] Appl. No.: 59,450

[30] Foreign Application Priority Data
Feb. 9, 1970   France...................................7006418

[52] U.S. Cl............................................................52/251
[51] Int. Cl...........................................................E04b 1/00
[58] Field of Search.................................................52/251

[56] References Cited

UNITED STATES PATENTS 776,252   11/1904   Moller......................................52/251
2,972,838   2/1961   Carlson.....................................52/251

*Primary Examiner*—Patrick D. Lawson
*Attorney*—William Anthony Drucker

[57] ABSTRACT

As assembly of concrete support elements joined at right angles to each other.

Each support element has a beveled end forming a joint plane between the two elements. Each bevel point is truncated and the truncation face carries a metal plate which is anchored to the truncation face by bass embedded in the mass of the support element. The two plates are tightened towards each other on their edge by tightening means incorporated therein.

8 Claims, 4 Drawing Figures

Patented May 30, 1972 3,665,665

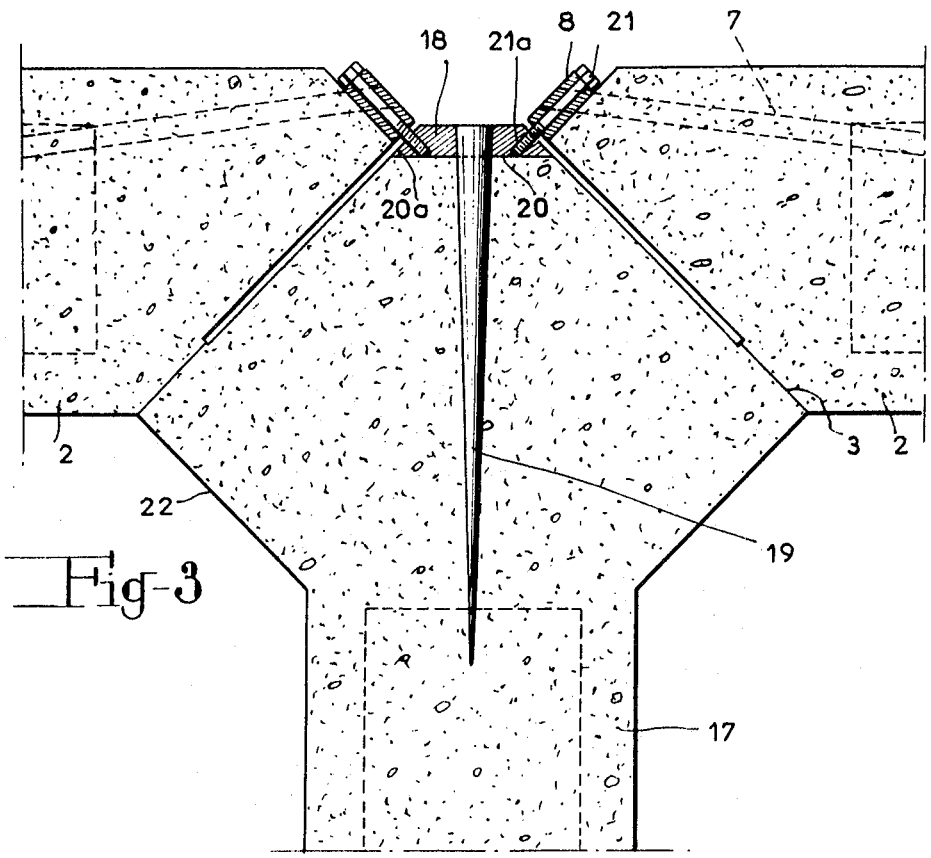
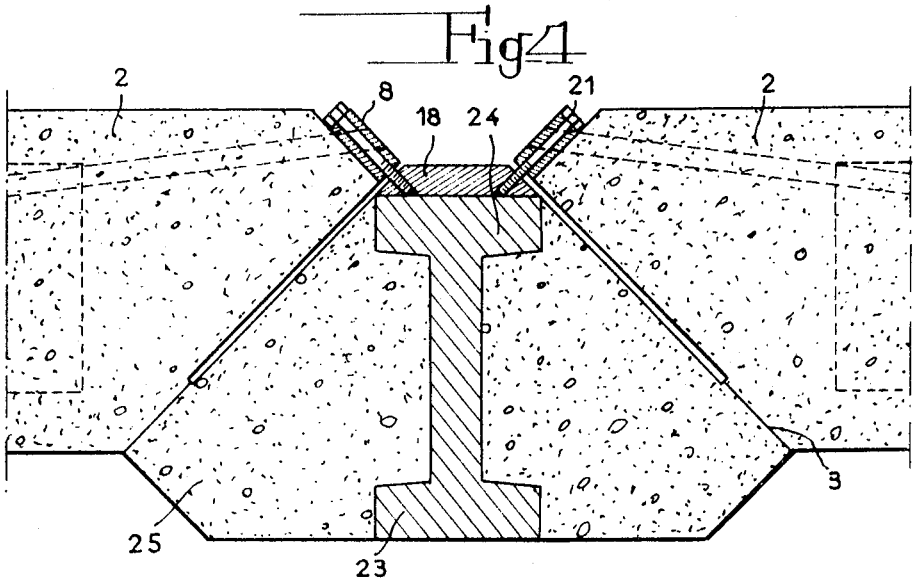

ASSEMBLY OF CONCRETE SUPPORT ELEMENTS

The invention relates to a device for assembling prefabricated pre-stressed concrete support elements, such as beams and pillars in general use in the construction of frameworks of buildings.

It has already been proposed for interconnecting beams, to weld together the iron rods extending out of the elements and to complete the joint by cementing.

This method is slow and permits no standardization of the ends of the elements.

Now, the object of the invention is to provide a device which employs the same assembling means whether it concerns a connection between a beam and a beam, a beam and a pillar or a beam and a support and pillar. It allows a maximum standardization of the support elements to be assembled and a simplification of the assembling functions, the mounting operation being restricted to the screwing of bolts. Another object of the invention is to provide a device affording an equilibrium of the load-resistance torques about the angular junction of the elements.

The invention provides an assembly of pre-fabricated concrete support elements comprising at least two support elements joined at right angles and having beveled ends so as to form a joint surface between the elements, each bevel point being truncated by a face surmounted by a metal plate which is anchored to said face by bass embedded in the mass of the element, the two plates being tightened towards each other on their edge by tightening means incorporated therein. Preferably, the joint plane bisects the angle made by the longitudinal axes of the elements.

In one embodiment, each truncation face and its corresponding plate are perpendicular to the joint plane, the plates being in the extension of each other and the common tightening means extending therethrough within the thickness of the plates.

In another embodiment, the assembly comprises a pillar having a horizontal truncation face surmounted by a plate having chamfered edges which are in the extension of the joint planes, each joined beam having a truncation face perpendicular to the joint plane and screws extending though the thickness of the plates of the beams and screwed into the edge portions of the plate of the pillar.

Further features of the invention will be apparent from the ensuing description with reference to the accompanying drawing given by way of example and in which:

FIG. 3 is an assembly view in elevation of a joint between two beams and a pillar, and FIG. 4 is an assembly view in elevation of a joint between two beams and a transverse beam.

Figure 1:
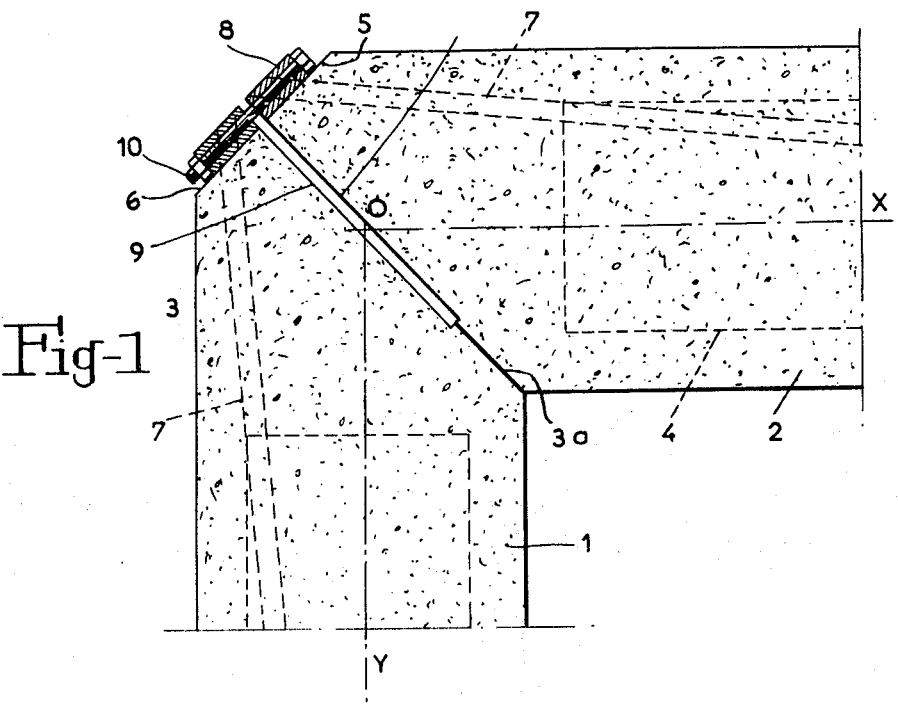
FIG. 1 is an assembly view in elevation of a joint between a beam and a pillar.

FIG. 1 shows a concrete pillar 1 having an axis OY joined to a beam 2 having a longitudinal axis OX. These two elements are beveled so as to join in a joint plane 3 which preferably bisects the right angle XOY. The elements are hollow in the conventional manner, as shown by the dotted lines 4. Each element is truncated on the outside by a truncation face 5, 6 affording a small face perpendicular to the joint plane 3. Iron bass 7 are embedded in the mass of the elements and anchored to plates 8 applied against the truncation faces 5, 6. The joint plane 3 is recessed in a part of its length, which results in the slot 9 shown in the drawing.

The plates 8 are tightened toward each other by bolts 10 which extend therethrough.

As will be seen, the tightening of the bolts 10 puts them under elastic tension opposing the positive torque which tends to open the assembly about the heel 3a. The fastening of the plates 8 by the iron bass 7 exerts, on the other hand, a force applied in the positive direction. A balancing of the loads can therefore be localized at precise points.

Figure 2:
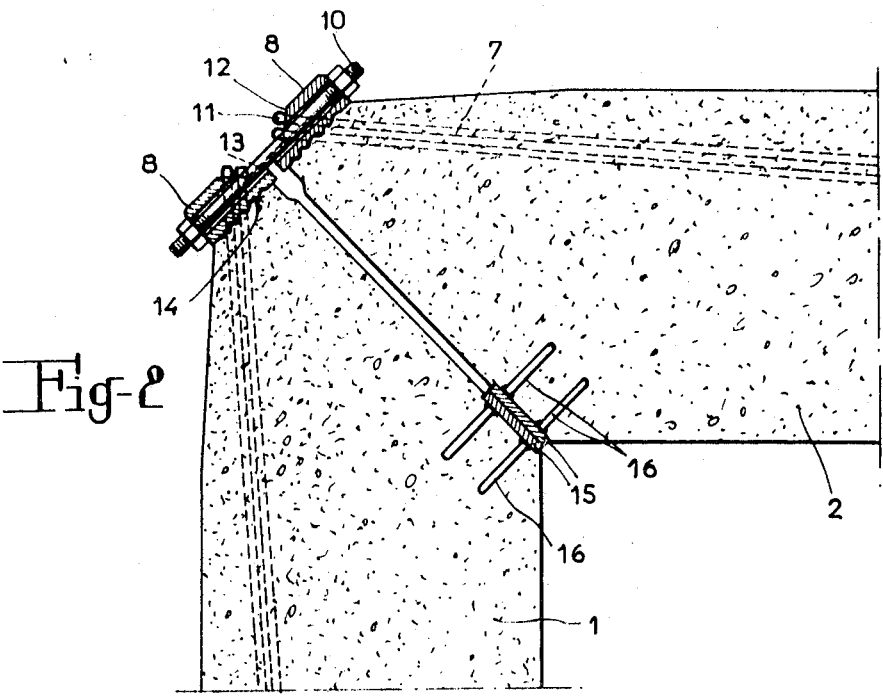
FIG. 2 is an elevational view of the joint shown in FIG. 1 with more constructional details.

FIG. 2 shows the fastening of the plates 8 in more detail. Each plate has a recessed portion 13 adjacent the joint plane, which affords a face 12 perpendicular to the direction in which the iron bass 7 extend. These bass terminate in a knot 11 which bears against the face 12. It will be observed that the inner face of the plates 8 has grooves 14 for increasing the grip. Further, as seen in FIG. 2, the heel of the joint surface has two sole plates 15 applied against each other, each sole plate being fastened to its support element by welded tie members 16.

An assembly view of a pillar supporting two beams is shown in FIG. 3, with a manner of assembling very close to the foregoing. The pillar 17 has a capital 22 with bisecting joints 3 and an upper truncation face 20. A plate 18 fastened by iron members 19 is placed on the face 20. The plates 18 has chamfered faces 20a which are in the extension of the joint plane 3. The beams are provided with a plate 8 as already mentioned, but instead of a bolt a screw 21 is employed which extends through the plate and is screwed into a tapped hole 21a in the plate 18.

An assembly identical to that shown in FIG. 3 is shown in FIG. 4, except that the support element is different. The I-section girder 23, 24 is embedded in a block 25 which has two joint planes 3 at 45° to each other as before. A plate 18 is placed on the truncation face, as already described.

It will be understood that the invention is applicable to assemblies which may have joint surfaces of various shapes but which have truncation faces and a support plate as hereinbefore defined.

I claim:

1. An assembly comprising at least two concrete support elements joined at right angles, each support element having a beveled end portion defining a joint surface engaged with the corresponding joint surface in a joint plane, each beveled portion having a truncated end defining a truncation face and a metal plate which adjoins said truncation face and is anchored to said truncation face by bass embedded in the mass of the support element, the two plates being tightened towards each other by tightening means incorporated therein.

2. An assembly as claimed in claim 1, wherein said joint plane bisects an angle made by longitudinal axes of said support elements.

3. An assembly as claimed in claim 1, wherein the two truncation faces and the adjoining plates are perpendicular to said joint plane and in the extension of each other, said tightening means extending through said plates within the thickness of said plates.

4. An assembly as claimed in claim 1, wherein one of said support elements is a pillar having a horizontal truncation face surmounted by its corresponding plate which has an edge portion chamfered in the extension of said joint plane, the other of said support elements being an adjoining beam having a truncation face and its corresponding plate perpendicular to said joint plane, said tightening means being screws extending through said beam plate within the thickness of said beam plate and screwthreadedly engaged in tapped holes in said chamfered edge portion.

5. An assembly as claimed in claim 1, wherein said bass anchoring said plates to the corresponding support element are metal members terminating in knobs which bear against a surface of the corresponding plate.

6. An assembly as claimed in claim 5 wherein each of the plates has a recess in a region of the plate adjacent said joint plane, said recess defining a bearing face for said knobs which is perpendicular to a direction in which said metal members extend.

7. An assembly as claimed in claim 1, comprising a recess in said joint surfaces in a part of said plates, whereby said joint has contacting bearing faces adjacent a corner defined by inner faces of said support elements.

8. An assembly as claimed in claim 7, wherein said bearing faces of said joint are combined with metal sole plates which are anchored in their corresponding support element by tie members.

* * * * *